(12) United States Patent
Miyagi

(10) Patent No.: US 8,724,197 B2
(45) Date of Patent: May 13, 2014

(54) IMAGE PROCESSING APPARATUSES, METHODS, AND COMPUTER PROGRAM PRODUCTS FOR COLOR CALIBRATION SUPERPOSING DIFFERENT COLOR PATCHES IN DIFFERENT ORDERS OF GRADATION VALUES

(75) Inventor: Noriko Miyagi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 308 days.

(21) Appl. No.: 13/067,277

(22) Filed: May 20, 2011

(65) Prior Publication Data

US 2011/0292417 A1 Dec. 1, 2011

(30) Foreign Application Priority Data

May 31, 2010 (JP) ................................. 2010-124441
Apr. 13, 2011 (JP) ................................. 2011-089290

(51) Int. Cl.
*H04N 1/60* (2006.01)

(52) U.S. Cl.
USPC ........................................ 358/523; 358/504

(58) Field of Classification Search
USPC .................... 358/518, 521, 523, 504
See application file for complete search history.

(56) References Cited

U.S. PATENT DOCUMENTS

| | | | | |
|---|---|---|---|---|
| 4,929,978 A * | 5/1990 | Kanamori et al. | ............ | 358/520 |
| 6,262,810 B1 * | 7/2001 | Bloomer | ................... | 358/504 |
| 6,494,557 B1 * | 12/2002 | Kato et al. | ................... | 358/504 |
| 7,356,160 B2 | 4/2008 | Shibaki et al. | | |
| 7,633,646 B2 * | 12/2009 | Ichitani | ................... | 358/521 |
| 7,667,711 B2 | 2/2010 | Miyagi | | |
| 2004/0165747 A1 | 8/2004 | Shibaki et al. | | |
| 2006/0256123 A1 | 11/2006 | Miyagi | | |
| 2006/0274332 A1 | 12/2006 | Miyagi | | |
| 2009/0073469 A1* | 3/2009 | Kita et al. | ................... | 358/1.9 |

FOREIGN PATENT DOCUMENTS

| | | | |
|---|---|---|---|
| JP | 2002123055 A | 4/2002 | |
| JP | 2003094732 A | 4/2003 | |

* cited by examiner

*Primary Examiner* — Scott A Rogers
(74) *Attorney, Agent, or Firm* — Harness, Dickey & Pierce

(57) ABSTRACT

An image processing apparatus includes a patch forming unit that forms a plurality of mixed-color patches by superposing single color patches of a plurality of colors with different gradation ratios according to gradation values; a color measuring unit that performs color measurement of the mixed-color patches; an estimating unit that estimates color values of single colors present in the mixed-color patches based on color measurement values obtained by performing color measurement; and a correction table setting unit that sets a correction table in order to correct the estimated color values of the single colors to target color values.

12 Claims, 6 Drawing Sheets

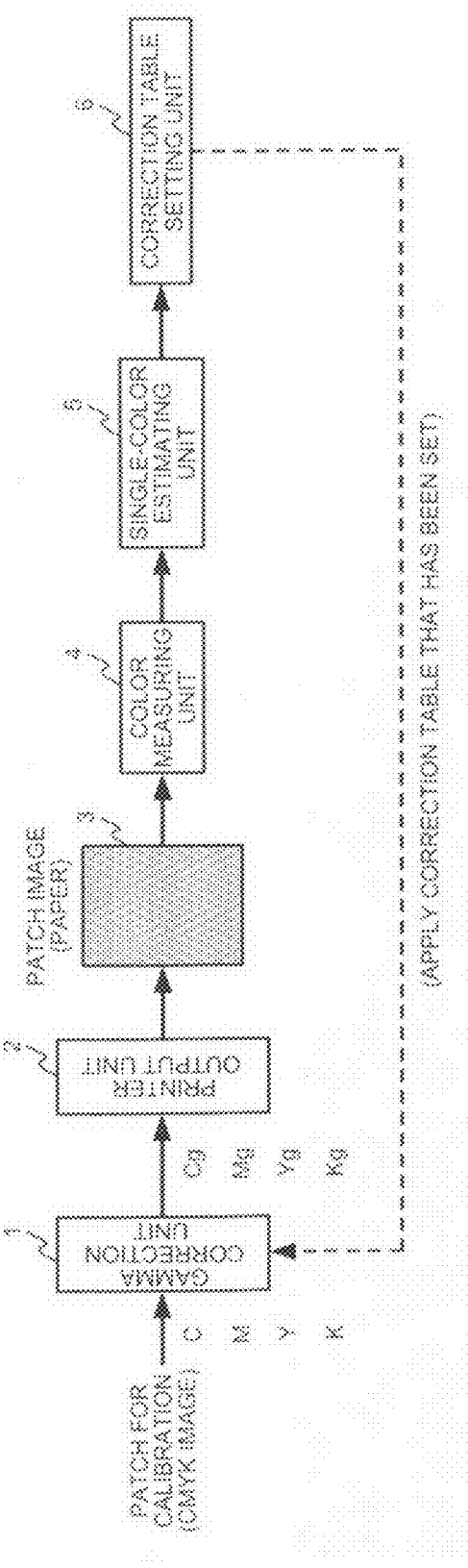

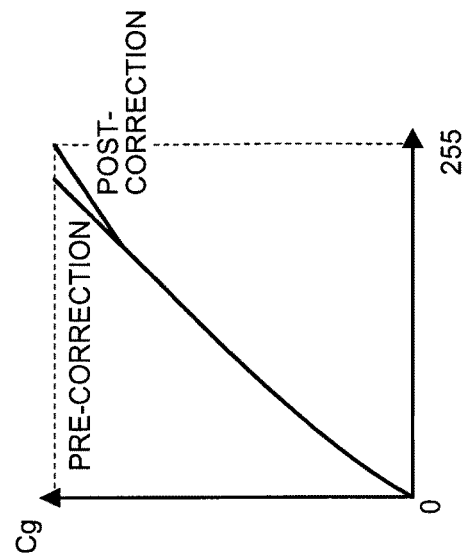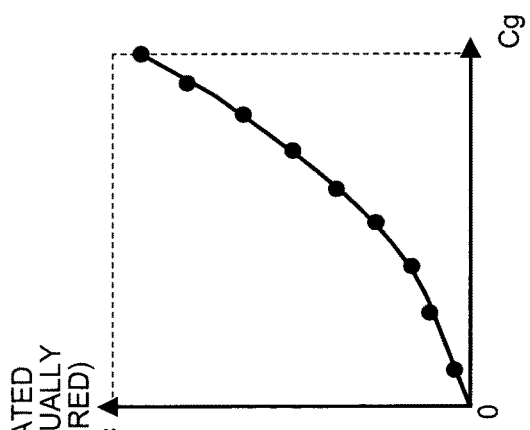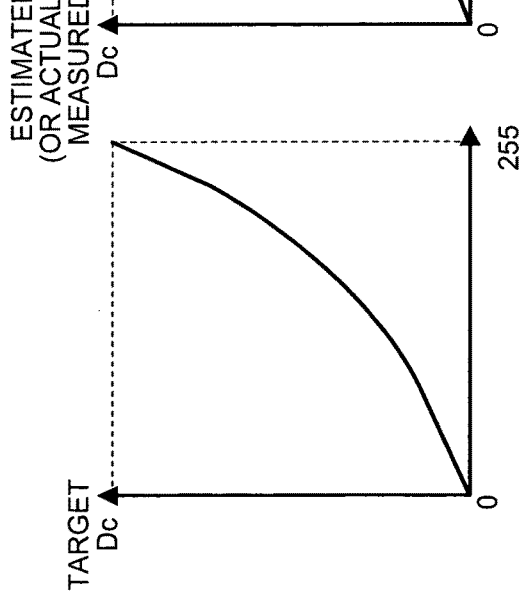

IMAGE PROCESSING APPARATUSES, METHODS, AND COMPUTER PROGRAM PRODUCTS FOR COLOR CALIBRATION SUPERPOSING DIFFERENT COLOR PATCHES IN DIFFERENT ORDERS OF GRADATION VALUES

CROSS-REFERENCE TO RELATED APPLICATIONS

The present application claims priority to and incorporates by reference the entire contents of Japanese Patent Application No. 2010-124441 filed in Japan on May 31, 2010 and Japanese Patent Application No. 2011-089290 filed in Japan on Apr. 13, 2011.

BACKGROUND OF THE INVENTION

1. Field of the Invention

The present invention relates to an image processing apparatus, an image processing method, and a computer product that enable high-accuracy calibration.

2. Description of the Related Art

When performing calibration of single colors by outputting single-color patches, color measurement is done by outputting the gradation patches of four colors of cyan (C), magenta (M), yellow (Y), and black (K). That results in an increase in the number of patches thereby leading to the following issues.

Usually, depending on image quality modes such as a high image quality mode or a standard mode, or depending on image attributes such as characters or photographs; a multifunction peripheral (MFP) implements different dither patterns. In an MFP, for each dither pattern, single-color gradation patches are output and scanned by a scanner for the purpose of calibration, or manual color measurement is done using an accompanying colorimeter for the purpose of calibration. However, if a large number of patch images are output in an MFP, then it is undesirable from the environmental perspective or from the economical perspective.

For the scanner to perform reading, the patch images that have been output on paper sheets need to be set one by one in the scanner, which requires time and efforts. Furthermore, when there are a large number of patches, a calibration system requiring manual color measurement using a colorimeter puts a lot of burden on the user.

Therefore, a technology is available in which outputting the single-color patches is replaced by outputting the mixed-color patches, and the color measurement values of the mixed-color patches are referred to for calculating the amount of correction required to ensure that the color values of the single colors correspond with target color values.

For example, Japanese Patent Application Laid-open No. 2003-094732 discloses that, when performing correction of an image recording apparatus, patches (test charts) that have a gray hue formed by a combination of substantially equal share of color pigments of cyan, magenta, and yellow, but have mutually different gray densities are printed as output. In Japanese Patent Application Laid-open No. 2003-094732, the patches are subjected to density measurement so as to obtain an integral density measurement value for each color pigment. Then, for each color pigment, an analytical density corresponding value is calculated from the difference between the integral density measurement value and an integral density reference value (target value). Moreover, the analytical density corresponding values are used to calculate conversion conditions (one-dimensional look-up table (LUT)) for regulating input signals for correction. Hence, in Japanese Patent Application Laid-open No. 2003-094732, it is possible to reduce the amount of recording material used in outputting test chart images.

However, in an apparatus in which mixed-color patches are output and the measurement values of the mixed-color patches are referred to for calculating the amount of correction required to ensure that the color values of the single colors correspond with target color values, sufficient attention is not given to performing total amount control of the mixed-color patches. That is, when it is assumed that there is 100% output of solid single colors, the total amount control in the electrophotographic technique is generally around 250%. Meanwhile, in the ink-jet technology, there are apparatuses with the total amount control around 150%. In the gray color obtained by superposing three colors, the total amount control is 300% at a maximum. Thus, in the abovementioned conventional technology, the calibration loses its accuracy in high-density areas on the high-density side because of the use of such mixed-color patch patterns that fall outside the total amount control range thereby not guaranteeing the output of stable colors.

SUMMARY OF THE INVENTION

It is an object of the present invention to at least partially solve the problems in the conventional technology.

According to an aspect of the present invention, there is provided an image processing apparatus that includes a patch forming unit that forms a plurality of mixed-color patches by superposing single color patches of a plurality of colors with different gradation ratios according to gradation values; a color measuring unit that performs color measurement of the mixed-color patches; an estimating unit that estimates color values of single colors present in the mixed-color patches based on color measurement values obtained by performing color measurement; and a correction table setting unit that sets a correction table in order to correct the estimated color values of the single colors to target color values.

According to another aspect of the present invention, there is provided an image processing method that includes forming a plurality of mixed-color patches by superposing single color patches of a plurality of colors with different gradation ratios according to gradation values; performing color measurement of the mixed-color patches; estimating color values of single colors present in the mixed-color patches based on color measurement values obtained by performing color measurement; and setting a correction table in order to correct the estimated color values of the single colors to target color values.

According to still another aspect of the present invention, there is provided a computer program product that includes a computer-readable medium having computer-readable program codes stored in the medium for processing information. The program codes when executed causes a computer to execute forming a plurality of mixed-color patches by superposing single color patches of a plurality of colors with different gradation ratios according to gradation values; performing color measurement of the mixed-color patches; estimating color values of single colors present in the mixed-color patches based on color measurement values obtained by performing color measurement; and setting a correction table in order to correct the estimated color values of the single colors to target color values.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a configuration an image processing apparatus according to an embodiment of the present invention;

FIGS. 7A, 7B, and 7C are explanatory diagrams for explaining a correction table setting unit illustrated in FIG. 1.

DETAILED DESCRIPTION OF THE PREFERRED EMBODIMENTS

Figure 2A:
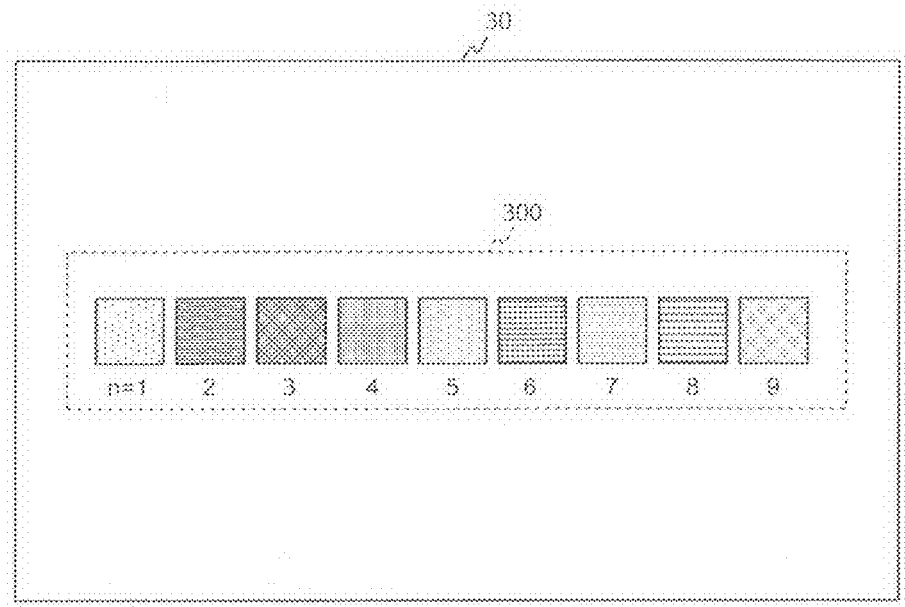
FIG. 2A is an illustrative diagram of a first configuration of a patch image.

An exemplary embodiment of the present invention is described in detail below with reference to the accompanying drawings. In the present embodiment, patch images (hereinafter, also referred to as "patches") for calibration are formed to enable estimation of the color values of single colors from mixed-color patches. Such patches for calibration are formed using the mixed-color patches falling within the total amount control range. For example, the patches for calibration are mixed-color patches formed by superposing first-type single-color patches arranged in the ascending order of gradation and second-type single-color patches arranged in the descending order of gradation.

Herein, a single-color patch points to a patch formed with a single color; while a mixed-color patch points to a patch formed by superposing single color patches of a plurality of colors.

FIG. 1 is a configuration an image processing apparatus according to the present embodiment. As illustrated in FIG. 1, the image processing apparatus includes, for processing a patch image 3, a gamma correction unit 1, a printer output unit 2, a color measuring unit 4, a single-color estimating unit 5, and a correction table setting unit 6.

The gamma correction unit 1 refers to a correction table and accordingly performs correction with respect to image data composed of patches for calibration and including four colors of cyan (C), magenta (M), yellow Y), and black (K). With respect to the gamma-corrected image data, the printer output unit 2 performs halftone processing, converts the data into color material amount, and outputs that color material amount as the patch image 3 on a paper surface. The color measuring unit 4 uses a colorimeter and performs color measurement of each patch output on the paper surface in order to obtain L*a*b* values. Alternatively, the color measuring unit 4 obtains RGB values by means of scanning and converts the RGB values into L*a*b* values. Such conversion can be performed by creating in advance a three-dimensional LUT that is used for RGB to L*a*b* conversion. The single-color estimating unit 5 refers to the L*a*b* values obtained by performing color measurement of the mixed-color patches and applies an approximation formula to estimate the densities of the single colors constituting the mixed colors. The correction table setting unit 6 sets a correction table in such a way that the estimated single color densities correspond with target densities. Meanwhile, the correction table referred to by the gamma correction unit 1 at the time of outputting the patches for calibration points to a correction table set at the time of the most recent calibration.

Meanwhile, in the present embodiment, the explanation is given for an example in which the estimated color values of the single colors and the target color values are defined by density, and the correction table is set in such a way that the single color densities correspond with target densities. However, the present invention is not limited to that case. That is, alternatively, the estimated color values of the single colors and the target color values can be defined by any attribute values that enable color identification. For example, instead of density, the estimated color values of the single colors and the target color values can be defined by a color difference ΔE between the Lab value of paper white and the Lab values of the single colors, that is, defined by the distances from the paper white in the Lab color space. Thus, regarding a single color, color identification can be done using the density or the color difference ΔE if it is regarded that the variation in the hue direction is very small and negligible.

FIG. 2A is an illustrative diagram of a first configuration of the patch image 3. On a paper surface 30, the printer output unit 2 forms n number (n=1 to 9) of mixed-color patches 300 in which single-color patches of the four colors of C, M, Y, and K are superposed with different gradation ratios according to the respective gradation values. In the present embodiment, although nine mixed-color patches 300 are formed, that number is not limited to nine and it is possible to have two or more mixed-color patches. Moreover, in the present embodiment, although the explanation is given for an example in which the mixed-color patches 300 are formed on the paper surface 30 by superposing single-color patches of four colors, the number of colors is not limited to four and the mixed-color patches 300 can be formed by superposing single-color patches of more than one color.

Herein, the mixed-color patches are assumed to be formed in the following manner. For each color, the printer output unit 2 forms on the paper surface 30 a plurality of single-color patches having different gradation values. At that time, the printer output unit 2 forms the single-color patches in such a way that the single-color patches of four colors are superposed to form mixed-color patches. Moreover, the printer output unit 2 ensures that the single-color patches constituting each mixed-color patch are superposed with different gradation ratios unique to that mixed-color patch.

Herein, different gradation ratios unique to each mixed-color patch means that the gradation values of the single-color patches constituting each mixed-color patch are unique to that mixed-color patch.

Figure 2B:
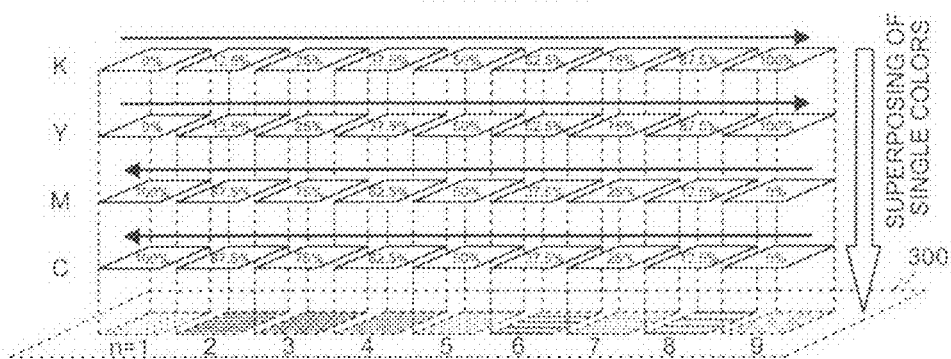
FIG. 2B is an illustrative diagram of a detailed configuration of mixed-color patches.

FIG. 2B is an illustrative diagram of a detailed configuration of the mixed-color patches 300 in the first configuration of the patch image 3. The printer output unit 2 forms n number (n=1 to 9) of single-color patches of K (black color) and n number (n=1 to 9) of single-color patches of Y (yellow color) in such a way that the gradation values of the single-color patches of each color change in the ascending order in a predetermined direction (from left to right in FIG. 2B). Similarly, the printer output unit 2 forms n number (n=1 to 9) of single-color patches of M (magenta color) and n number (n=1 to 9) of single-color patches of C (cyan color) in such a way that the gradation values of the single-color patches of each color change in the descending order in the abovementioned predetermined direction. At that time, the printer output unit 2 superposes the single-color patches of K, Y, M, and C colors so as to form n number (n=1 to 9) of mixed-color patches. In the present embodiment, the explanation is given under the assumption that the image processing apparatus is an electrophotographic printer and the total amount control is 240%. When the single-color patches are superposed as illustrated in FIG. 2B, all of the n number (n=1 to 9) of mixed-color patches are formed within a total amount control range of 200%. Moreover, in the present embodiment, the single-color patches having all gradation values sampled in a uniform manner are superposed. Hence, at the time of creating a correction table by estimating the single colors from the mixed-color patches, it becomes possible to create a high-accuracy correction table from the sampling points at appropriate intervals.

Figure 2C:
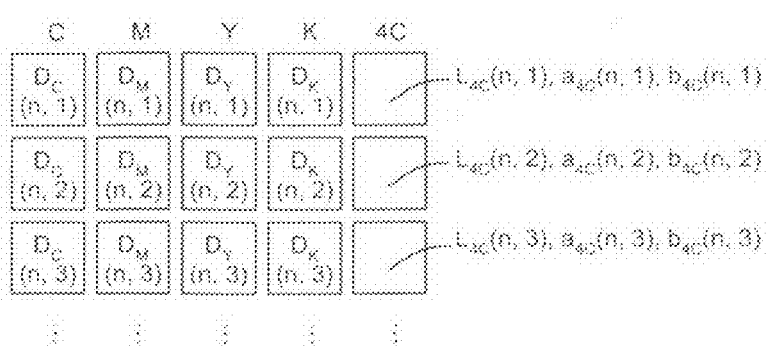
FIG. 2C is an explanatory diagram for explaining the patch image used for determining the parameters of an approximation formula.

FIG. 2C is an explanatory diagram for explaining a patch image used for determining the parameters of an approximation formula applied by the single-color estimating unit 5 to perform single color estimation from the first configuration of the patch image 3.

Equation (1) represents an approximation formula for estimating the densities of the single colors of C, M, Y, and K from a mixed-color patch (4C) formed by superposing the four single colors. Herein, Equation (1) is given for a case when the mixed-color Lab values are assumed to be $L_{4C}(n)$, $a_{4C}(n)$, and $b_{4C}(n)$; and the single-color densities are assumed to be $D_C(n)$, $D_M(n)$, $D_Y(n)$, and $D_K(n)$. Moreover, in Equation (1), the matrix coefficients serving as parameters of the approximation formula are assumed to be $c1(n)$ to $c3(n)$, $m1(n)$ to $m3(n)$, $y1(n)$ to $y3(n)$, and $k1(n)$ to $k3(n)$.

For each mixed-color patch, the single-color estimating unit 5 sets in advance the matrix coefficients of Equation (1). The following explanation is given for an example of matrix coefficient setting of an approximation formula applied to estimate the single colors from the mixed-color patch corresponding to n=3. In an identical manner to the patches for calibration; a set consisting of five patches, including four single-color patches and a mixed-color patch formed by superposing the four single-color patches, is subjected to correction in the gamma correction unit 1 and is output from the printer output unit 2. In the image processing apparatus; the set of five patches, in which the gradation values of the single-color patches are varied in the range of −10 to +10 around C=191, M=191, Y=63, and K=63, is subjected to correction in the gamma correction unit 1 and is output from the printer output unit 2. Herein, of the 256 gradations, the gradation value 63 corresponds to 25% of gradation (assuming that the gradation value 255 is 100% of gradation) and the gradation value 191 corresponds to 75% of gradation. Then, with respect to the output patches, the color measuring unit 4 performs color measurement. More specifically, the color measuring unit 4 obtains the densities $D_C(n, i)$, $D_M(n, i)$, $D_Y(n, i)$, and $D_K(n, i)$ of the single-color patches, and obtains the Lab values $L_{4C}(n, i)$, $a_{4C}(n, i)$, and $b_{4C}(n, i)$ of the mixed-color patch. Herein, "i" represents that the color measurement value belongs to a set consisting of the i-th single-color patch and the mixed-color patch. Subsequently, in Equation (2), the single-color estimating unit 5 substitutes the color measurement values of all patches that have been output and obtains the matrix coefficients by means of regression analysis (minimum mean square error).

$$(D_C(n) \ D_M(n) \ D_Y(n) \ D_K(n)) = \qquad (1)$$
$$(L_{4C}(n) \ a_{4C}(n) \ b_{4C}(n)) \cdot \begin{pmatrix} c1(n) & m1(m) & y1(n) & k1(n) \\ c2(n) & m2(m) & y2(n) & k2(n) \\ c3(n) & m3(m) & y3(n) & k3(n) \end{pmatrix}$$

$$\begin{pmatrix} D_C(n,1) & D_M(n,1) & D_Y(n,1) & D_K(n,1) \\ D_C(n,2) & D_M(n,2) & D_Y(n,2) & D_K(n,2) \\ D_C(n,3) & D_M(n,3) & D_Y(n,3) & D_K(n,3) \\ \vdots & \vdots & \vdots & \vdots \end{pmatrix} = \qquad (2)$$

$$\begin{pmatrix} L_{4C}(n,1) & a_{4C}(n,1) & b_{4C}(n,1) \\ L_{4C}(n,2) & a_{4C}(n,2) & b_{4C}(n,2) \\ L_{4C}(n,3) & a_{4C}(n,3) & b_{4C}(n,3) \\ \vdots & \vdots & \vdots \end{pmatrix} \cdot \begin{pmatrix} c1(n) & m1(m) & y1(n) & k1(n) \\ c2(n) & m2(m) & y2(n) & k2(n) \\ c3(n) & m3(m) & y3(n) & k3(n) \end{pmatrix}$$

In this way, in the image processing apparatus according to the present embodiment, the patches are output in such an arrangement that a mixed-color patch is formed within the total amount control range. The output patches are then subjected to color measurement, and the color values of the single colors are estimated from the color measurement value of the mixed-color patch. Then, a correction table is set in such a way that the estimated color values of the single colors are corrected to the target color values. That enables achieving reduction in the number of patches in the mixed-color patch and enables performing high-accuracy calibration over the entire density range.

Figure 3A:
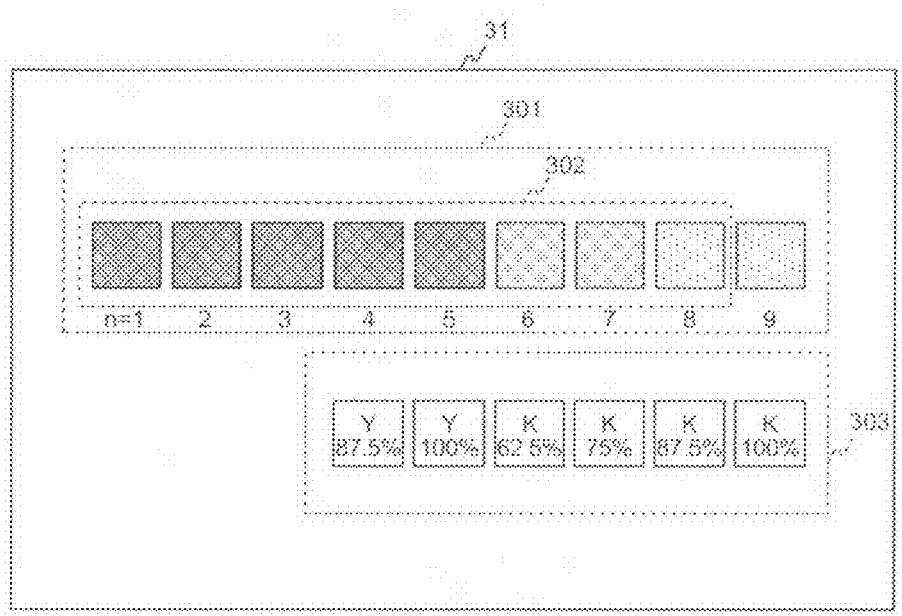
FIG. 3A is an illustrative diagram of a second configuration of the patch image.

FIG. 3A is an illustrative diagram of a second configuration of the patch image 3. On a paper surface 31, the printer output unit 2 forms n number (n=1 to 9) of mixed-color patches 301, in which single-color patches of either all four colors of C, M, Y, and K are superposed with different color numbers according to the gradation values or three colors or two colors from among the four colors are superposed with different color numbers according to the gradation values. Besides, on the paper surface 31, the printer output unit 2 also forms single-color patches 303 as a collection of those single-color patches which correspond to the missing gradation portion not covered by the single colors estimated from the mixed-color patches 301. As far as the single-color gradations included in the single-color patches 303 are concerned, the color measurement values measured by the color measuring unit 4 are used without modification by the correction table setting unit 6, while bypassing the single-color estimating unit 5.

Figure 3B:
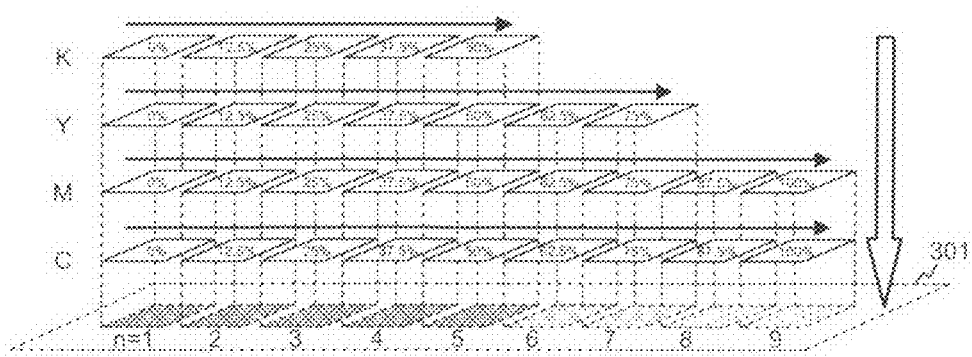
FIG. 3B is an illustrative diagram of a detailed configuration of mixed-color patches.

FIG. 3B is an illustrative diagram of a detailed configuration of the mixed-color patches 301 in the second configuration of the patch image 3.

The printer output unit 2 forms five mixed-color patches corresponding to n=1 to 5 by superposing the single-color patches of four colors (C, M, Y, and K), which have the gradation values arranged in the ascending order, with the gradation ratio of 1:1:1:1. Subsequently, the printer output unit 2 forms two mixed-color patches corresponding to n=6 and 7 by superposing the single-color patches of three colors (C, M, and Y) excluding K with the gradation ratio of 1:1:1 (i.e., superposing with the gradation ratio of C:M:Y:K=1:1:1:0). Then, the printer output unit 2 forms two mixed-color patches corresponding to n=8 and 9 by superposing the single-color patches of two colors (C and M) excluding Y and K with the gradation ratio of 1:1 (i.e., superposing with the gradation ratio of C:M:Y:K=1:1:0:0). If the printer output unit 2 forms all of the mixed-color patches with the gradation ratio of C:M:Y:K=1:1:1:1, then the mixed-color patch corresponding to n=6 has the gradation of 62.5%×4=250%. In that case, the mixed-color patches beyond n=6 fall outside the total amount control range. Moreover, if the mixed-color patches corresponding to n≥6 are formed with the gradation ratio of C:M:Y:K=1:1:1:0, then the mixed-color patch corresponding to n=8 has the gradation of 87.5%×3=262.5%. In that case, the mixed-color patches beyond n=8 fall outside the total amount control range. Therefore, in the image processing apparatus according to the present embodiment, the number of single colors to be superposed is adjusted according to the gradation values so that the mixed-color patches are formed only with the patches falling within the total amount control range.

Equation (3) represents an approximation formula for estimating the single color densities $D_C(n)$, $D_M(n)$, $D_Y(n)$, and $D_K(n)$ from the mixed-color patches corresponding to n=2 to 5. In Equation (3), the mixed-color Lab values are assumed to be $L_{4C}(n)$, $a_{4C}(n)$, and $b_{4C}(n)$; and the matrix coefficients are assumed to be c1_a to c3_a, m1_a to m3_a, y1_a to y3_a, and k1_a to k3_a.

Equation (4) represents an approximation formula for estimating the single color densities $D_C(n)$, $D_M(n)$, and $D_Y(n)$ from the mixed-color patches corresponding to n=6 and 7. In Equation (4), the mixed-color Lab values are assumed to be $L_{3C}(n)$, $a_{3C}(n)$, and $b_{3C}(n)$; and the matrix coefficients corresponding are assumed to be c1_b to c3_b, m1_b to m3_b, and y1_b to y3_b.

Equation (5) represents an approximation formula for estimating the single color densities $D_C(n)$ and $D_M(n)$ from the mixed-color patches corresponding to n=8 and 9. In Equation (5), the mixed-color Lab values are assumed to be $L_B(n)$, $a_B(n)$, and $b_B(n)$; and the matrix coefficients corresponding are assumed to be c1_c, c2_c, m1_c, and m2_c.

$$(D_C(n) \quad D_M(n) \quad D_Y(n) \quad D_K(n)) = \qquad (3)$$
$$(L_{4C}(n) \quad a_{4C}(n) \quad b_{4C}(n)) \cdot \begin{pmatrix} c1\_a & m1\_a & y1\_a & k1\_a \\ c2\_a & m2\_a & y2\_a & k2\_a \\ c3\_a & m3\_a & y3\_a & k3\_a \end{pmatrix}$$

$$(D_C(n) \quad D_M(n) \quad D_Y(n)) = \qquad (4)$$
$$(L_{3C}(n) \quad a_{3C}(n) \quad b_C(n)) \cdot \begin{pmatrix} c1\_b & m1\_b & y1\_b \\ c2\_b & m2\_b & y2\_b \\ c3\_b & m3\_b & y3\_b \end{pmatrix}$$

$$(D_C(n) \quad D_M(n)) = (L_B(n) \quad a_B(n) \quad b_B(n)) \cdot \begin{pmatrix} c1\_c & m1\_c \\ c2\_c & m2\_c \end{pmatrix} \qquad (5)$$

Assume that the mixed-color patches are formed by superposing the single-color patches with the same ratio (gradation ratio) and the gradation values are not far apart from one another. In such a case, the mixed-color characteristics of all mixed-color patches are similar. Moreover, if the matrix coefficients are set for each such mixed-color patch, then the matrix coefficients of all mixed-color patches are also close in values. Thus, alternatively, even if common matrix coefficients are set for all mixed-color patches instead of performing matrix coefficient setting on an individual basis; it is empirically observed that the single color densities can be approximated with an accuracy not posing any practical problem. Hence, the image processing apparatus according to the present embodiment is configured in such a way that the mixed-color patches corresponding to n=2 to 5 are assigned with the same set of matrix coefficients, the mixed-color patches corresponding to n=6 and 7 are assigned with the same set of matrix coefficients, and the mixed-color patches corresponding to n=8 and 9 are assigned with the same set of matrix coefficients. Herein, corresponding to n=1, no mixed-color patch is output in real terms and the measurement values of paper white are obtained. Hence, corresponding to n=1, the measurement values of paper white are used without modification by the correction table setting unit 6, while bypassing the single-color estimating unit 5.

Meanwhile, in Equations (3) to (5), the single-color estimating unit 5 sets the matrix coefficients in advance.

Matrix Coefficient Setting Method for Equation (3)

In the image processing apparatus, a set consisting of single-color patches and a mixed-color patch, in which the gradation values of the single-color patches are varied in the range of −10 to +10 around C=M=Y=K=31, 63, 95, 127 representing the gradation values of the patches corresponding to n=2 to 5, is subjected to correction in the gamma correction unit 1 and is output from the printer output unit 2. The color measuring unit 4 then performs color measurement of the output patches (the single-color patches and the mixed-color patch). More specifically, the color measuring unit 4 obtains the densities $D_C(n, i)$, $D_M(n, i)$, $D_Y(n, i)$, and $D_K(n, i)$ of the single-color patches, and obtains the Lab values $L_{4C}(n, i)$, $a_{4C}(n, i)$, and $b_{4C}(n, i)$ of the mixed-color patch. Then, in Equation (6), the single-color estimating unit 5 substitutes the color measurement values of all patches that have been output and obtains the matrix coefficients by means of regression analysis (minimum mean square error).

$$\begin{pmatrix} D_C(2,1) & D_M(2,1) & D_Y(2,1) & D_K(2,1) \\ D_C(2,2) & D_M(2,2) & D_Y(2,2) & D_K(2,2) \\ D_C(2,3) & D_M(2,3) & D_Y(2,3) & D_K(2,3) \\ \vdots & \vdots & \vdots & \vdots \\ D_C(3,1) & D_M(3,1) & D_Y(3,1) & D_K(3,1) \\ \vdots & \vdots & \vdots & \vdots \\ D_C(4,1) & D_M(4,1) & D_Y(4,1) & D_K(4,1) \\ \vdots & \vdots & \vdots & \vdots \\ D_C(5,1) & D_M(5,1) & D_Y(5,1) & D_K(5,1) \\ \vdots & \vdots & \vdots & \vdots \end{pmatrix} = \qquad (6)$$

$$\begin{pmatrix} L_{4C}(2,1) & a_{4C}(2,1) & b_{4C}(2,1) \\ L_{4C}(2,2) & a_{4C}(2,2) & b_{4C}(2,2) \\ L_{4C}(2,3) & a_{4C}(2,3) & b_{4C}(2,3) \\ \vdots & \vdots & \vdots \\ L_{4C}(3,1) & a_{4C}(3,1) & b_{4C}(3,1) \\ \vdots & \vdots & \vdots \\ L_{4C}(4,1) & a_{4C}(4,1) & b_{4C}(4,1) \\ \vdots & \vdots & \vdots \\ L_{4C}(5,1) & a_{4C}(5,1) & b_{4C}(5,1) \\ \vdots & \vdots & \vdots \end{pmatrix} \cdot \begin{pmatrix} c1\_a & m1\_a & y1\_a & k1\_a \\ c2\_a & m2\_a & y2\_a & k2\_a \\ c3\_a & m3\_a & y3\_a & k3\_a \end{pmatrix}$$

Matrix Coefficient Setting Method for Equation (4)

In the image processing apparatus, a set consisting of single-color patches and a mixed-color patch, in which the gradation values of the single-color patches are varied in the range of −10 to +10 around C=M=Y=K=159, 191 as the gradation values of the patches corresponding to n=6 and 7, is subjected to correction in the gamma correction unit 1 and is output from the printer output unit 2. The color measuring unit 4 then performs color measurement of the output patches (the single-color patches and the mixed-color patch). More specifically, the color measuring unit 4 obtains the densities $D_C(n, i)$, $D_M(n, i)$, and $D_Y(n, i)$ of the single-color patches, and obtains the Lab values $L_C(n, i)$, $a_{3C}(n, i)$, and $b_{3C}(n, i)$ of the mixed-color patch. Then, in Equation (7), the single-color estimating unit 5 substitutes the color measurement values of all patches that have been output and obtains the matrix coefficients by means of regression analysis (minimum mean square error).

$$\begin{pmatrix} D_C(6,1) & D_M(6,1) & D_Y(6,1) \\ D_C(6,2) & D_M(6,2) & D_Y(6,2) \\ D_C(6,3) & D_M(6,3) & D_Y(6,3) \\ \vdots & \vdots & \vdots \\ D_C(7,1) & D_M(7,1) & D_Y(7,1) \\ \vdots & \vdots & \vdots \end{pmatrix} = \qquad (7)$$

$$\begin{pmatrix} L_{3C}(6,1) & a_{3C}(6,1) & b_{3C}(6,1) \\ L_{3C}(6,2) & a_{3C}(6,2) & b_{3C}(6,2) \\ L_{3C}(6,3) & a_{3C}(6,3) & b_{3C}(6,3) \\ \vdots & \vdots & \vdots \\ L_{3C}(7,1) & L_{3C}(7,1) & L_{3C}(7,1) \\ \vdots & \vdots & \vdots \end{pmatrix} \cdot \begin{pmatrix} c1\_b & m1\_b & y1\_b \\ c2\_b & m2\_b & y2\_b \\ c3\_b & m3\_b & y3\_b \end{pmatrix}$$

Matrix Coefficient Setting Method for Equation (5)

In the image processing apparatus, a set consisting of single-color patches and a mixed-color patch, in which the gradation values of the single-color patches are varied in the range of −10 to +10 around C=M=Y=K=223, 255 as the gradation values of the patches corresponding to n=8 and 9, is subjected to correction in the gamma correction unit 1 and is output from the printer output unit 2. The color measuring unit 4 then performs color measurement of the output patches. More specifically, the color measuring unit 4 obtains the densities $D_C(n, i)$ and $D_M(n, i)$ of the single-color patches, and obtains the Lab values $L_B(n, i)$, $a_B(n, i)$, and $b_B(n, i)$ of the mixed-color patch. Then, in Equation (8), the single-color estimating unit 5 substitutes the color measurement values of all patches that have been output and obtains the matrix coefficients by means of regression analysis (minimum mean square error).

$$\begin{pmatrix} D_C(8,1) & D_M(8,1) \\ D_C(8,2) & D_M(8,2) \\ D_C(8,3) & D_M(8,3) \\ \vdots & \vdots \\ D_C(9,1) & D_M(9,1) \\ \vdots & \vdots \end{pmatrix} = \qquad (8)$$

$$\begin{pmatrix} L_B(8,1) & a_B(8,1) & b_B(8,1) \\ L_B(8,2) & a_B(8,2) & b_B(8,2) \\ L_B(8,3) & a_B(8,3) & b_B(8,3) \\ \vdots & \vdots & \vdots \\ L_B(9,1) & a_B(9,1) & b_B(9,1) \\ \vdots & \vdots & \vdots \end{pmatrix} \cdot \begin{pmatrix} c1\_c & m1\_c \\ c2\_c & m2\_c \end{pmatrix}$$

Figure 4A:
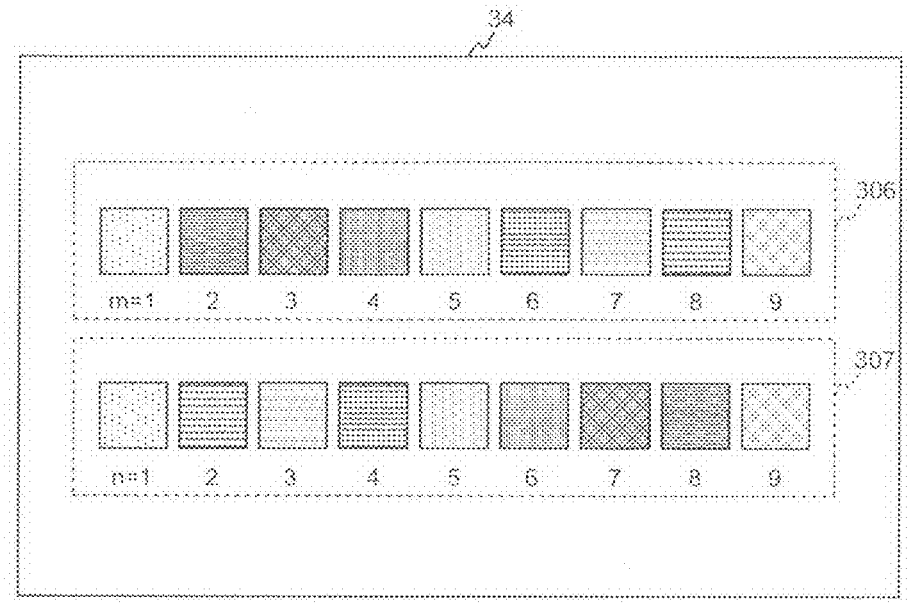
FIG. 4A is an illustrative diagram of a third configuration of the patch image.

FIG. 4A is an illustrative diagram of a third configuration of the patch image 3. On a paper surface 34, the printer output unit 2 forms m number (m=1 to 9) of mixed-color patches 306, in which single-color patches of two colors of M and Y are superposed with different ratios (gradation ratios) according to the gradation values. Moreover, on the paper surface 34, the printer output unit 2 forms n number (n=1 to 9) of mixed-color patches 307, in which single-color patches of two colors of C and K are superposed with different gradation ratios according to the gradation values.

Figure 4B:
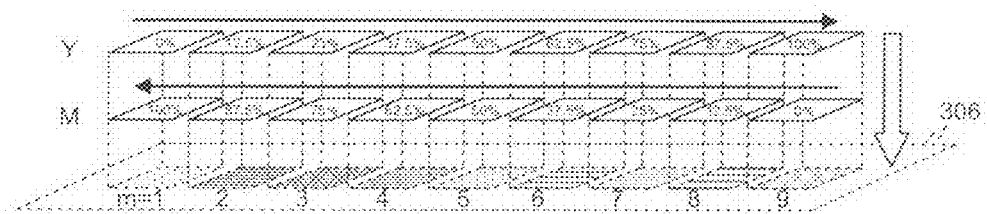
FIGS. 4B and 4C are illustrative diagrams of detailed configurations of mixed-color patches.

FIG. 4B is an illustrative diagram of a detailed configuration of the mixed-color patches 306 in the third configuration of the patch image 3. The printer output unit 2 forms the single-color patches of Y in such a way that the gradation values of the single-color patches change in the ascending order and forms the single-color patches of M in such a way that the gradation values of the single-color patches change in the descending order. Then, the printer output unit 2 forms m number (m=1 to 9) of mixed-color patches by superposing the single-color patches of Y and M colors.

Equation (9) represents the approximation formula for estimating single color densities of the single colors of M and Y from a mixed-color patch formed by superposing the two colors. In Equation (9), the mixed-color Lab values are assumed to be $L_R(m)$, $a_R(m)$, and $b_R(m)$; the matrix coefficients are assumed to be m1(m), m2(m), y1(m), and y2(m); and the single-color densities are assumed to be $D_M(m)$ and $D_Y(m)$.

For each mixed-color patch except the mixed-color patches corresponding to m=1 and m=9, the single-color estimating unit 5 sets in advance the matrix coefficients of Equation (9). The following explanation is given for an example of matrix coefficient setting of an approximation formula applied to estimate the single colors from the mixed-color patch corresponding to m=3. In the image processing apparatus, a set consisting of three patches is taken into consideration that includes two single-color patches and a mixed-color patch formed by superposing the two single-color patches. In that set of patches, the gradation values are varied in the range of −10 to +10 around M=191 and Y=63. The set of patches is then subjected to correction in the gamma correction unit 1 and is output from the printer output unit 2. Then, the color measuring unit 4 performs color measurement of the output patches. More specifically, the color measuring unit 4 obtains the densities $D_M(m, i)$ and $D_Y(m, i)$ of the single-color patches, and obtains the Lab values $L_R(m, i)$, $a_R(m, i)$, and $b_R(m, i)$ of the mixed-color patch. Then, in Equation (10), the single-color estimating unit 5 substitutes the color measurement values of all patches that have been output and obtains the matrix coefficients by means of regression analysis (minimum mean square error).

$$( D_M(m) \quad D_Y(m) ) = ( L_R(m) \quad a_R(m) \quad b_R(m) ) \cdot \begin{pmatrix} m1(m) & y1(m) \\ m2(m) & y2(m) \end{pmatrix} \qquad (9)$$

$$\begin{pmatrix} D_M(m,1) & D_Y(m,1) \\ D_M(m,2) & D_Y(m,2) \\ D_M(m,3) & D_Y(m,3) \\ \vdots & \vdots \end{pmatrix} = \qquad (10)$$

$$\begin{pmatrix} L_R(m,1) & a_R(m,1) & b_R(m,1) \\ L_R(m,2) & a_R(m,2) & b_R(m,2) \\ L_R(m,3) & a_R(m,3) & a_R(m,3) \\ \vdots & \vdots & \vdots \end{pmatrix} \cdot \begin{pmatrix} m1(m) & y1(m) \\ m2(m) & y2(m) \end{pmatrix}$$

Figure 4C:
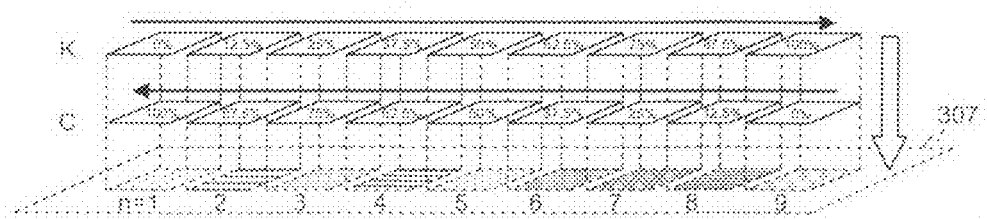

FIG. 4C is an illustrative diagram of a detailed configuration of the mixed-color patches 307 in the third configuration of the patch image 3. The printer output unit 2 forms the single-color patches of K in such a way that the gradation values of the single-color patches change in the ascending order and forms the single-color patches of C in such a way that the gradation values of the single-color patches change in the descending order. Then, the printer output unit 2 forms n number (n=1 to 9) of mixed-color patches by superposing the single-color patches of C and K colors.

Equation (11) represents an approximation formula for estimating the densities of the single colors of C and K from a mixed-color patch formed by superposing the two colors. In Equation (11), the mixed-color Lab values are assumed to be $L_{CK}(n)$, $a_{CK}(n)$, and $b_{CK}(n)$; the matrix coefficients are assumed to be c1(n), c2(n), k1(n), and k2(n); and the single-color densities are assumed to be $D_C(n)$ and $D_K(n)$.

For each mixed-color patch except the mixed-color patches corresponding to n=1 and n=9, the single-color estimating unit 5 sets in advance the matrix coefficients of Equation (11). The following explanation is given for an example of matrix coefficient setting for an approximation formula applied to estimate the single colors from the mixed-color patch corresponding to n=3. In the image processing apparatus, a set consisting of three patches is taken into consideration that includes two single-color patches and a mixed-color patch formed by superposing the two single-color patches. In that set of patches, the gradation values are varied in the range of −10 to +10 around C=191 and K=63. The set of patches is then subjected to correction in the gamma correction unit 1 and is output from the printer output unit 2. Then, the color measuring unit 4 performs color measurement of the output patches. More specifically, the color measuring unit 4 obtains the densities $D_C(n, i)$ and $D_K(n, i)$ of the single-color patches, and obtains the Lab values $L_{CK}(n, i)$, $a_{CK}(n, i)$, and $b_{CK}(n, i)$ of the mixed-color patch. Then, in Equation (12), the single-color estimating unit 5 substitutes the color measurement values of all patches that have been output and obtains the matrix coefficients by means of regression analysis (minimum mean square error).

$$(D_C(n) \quad D_K(n)) = (L_{CK}(n) \quad a_{CK}(n) \quad b_{CK}(n)) \cdot \begin{pmatrix} c1(n) & k1(n) \\ c2(n) & k2(n) \end{pmatrix} \quad (11)$$

$$\begin{pmatrix} D_C(n,1) & D_K(n,1) \\ D_C(n,2) & D_K(n,2) \\ D_C(n,3) & D_K(n,3) \\ \vdots & \vdots \end{pmatrix} = \begin{pmatrix} L_{CK}(n,1) & a_{CK}(n,1) & b_{CK}(n,1) \\ L_{CK}(n,2) & a_{CK}(n,2) & b_{CK}(n,2) \\ L_{CK}(n,3) & a_{CK}(n,3) & b_{CK}(n,3) \\ \vdots & \vdots & \vdots \end{pmatrix} \cdot \begin{pmatrix} c1(n) & k1(n) \\ c2(n) & k2(n) \end{pmatrix} \quad (12)$$

As illustrated in FIGS. 4B and 4C, when the single-color patches of two colors are superposed after arranging them in the ascending order of gradation values and the descending order of gradation values, respectively; all mixed-color patches can be formed with 100% gradation. Thus, even if the image processing apparatus according to the present embodiment is applied to the ink-jet technique that has a stricter total amount control than the electrophotographic technique, calibration can be performed with stable mixed-color patches, thereby enabling achieving a wide scope of application. Moreover, since the mixed-color patches at both ends corresponding to m=1, n=1, m=9, and n=9 are formed as single-color patches with 100% gradation, the measurement values of those four patches can be used without modification by the correction table setting unit 6, while bypassing the single-color estimating unit 5.

Meanwhile, regarding 100% gradation of a single color, approximation from a mixed-color patch leads to a decrease in the approximation accuracy as compared to other gradation ratios. Such a condition can occur due to multiple reasons. Firstly, as described above, the matrix coefficients serving as the parameters of an approximation formula are set on the basis of the color measurement values of such patches of which the gradation values are varied in the range of −10 to +10 with respect to the gradation values of the single-color patches to be estimated. However, in the matrix coefficients setting done for estimating the single-color densities at the gradation value 255, the gradation value is highest and thus can actually be varied only in the range of −10 to 0. That sometimes leads to a decrease in the approximation accuracy. Moreover, as described later with reference to FIG. 7, it is necessary to take into consideration the gradation characteristics in the vicinity of 100% gradation, and there are times when correction during calibration is not done to the target density in a precise sense (but the correction table is modified). The parameters of an approximation formula are set in such a way that the single colors can be estimated with high accuracy in the vicinity of the patches corresponding to the gradation values used in matrix coefficient setting. Hence, if the single colors stray too far from the colors of the patches corresponding to the gradation values used in matrix coefficient setting, then sometimes the approximation accuracy decreases accordingly. Moreover, in the image processing apparatus, at the time of outputting patches for calibration, such mixed-color patches are output that are within the range in which a certain level of approximation accuracy is guaranteed. More particularly, in the image processing apparatus, outputting from the printer output unit 2 is preceded by the correction performed by the gamma correction unit 1 using the correction table that is set at the time of the most recent calibration. However, in the case of a patch having 100% gradation, the correction table also needs to be modified. Hence, in the image processing apparatus, even if outputting is done after the correction using the correction table, there are times when the patches having densities straying from the density of the gradation patches used in matrix coefficient setting. Thus, in the image processing apparatus, there are times when approximation accuracy cannot be really guaranteed. Furthermore, if the correction table is modified for each single color at the vicinity of 100% gradation as illustrated in FIG. 7, hue skew occurs in the mixed colors thereby making it difficult to perform approximation using the linear approximation method.

Therefore, in the image processing apparatus, it is desirable to use the color measurement values as far as the single colors of 100% gradation are concerned and, as far as other gradations are concerned, it is desirable to use the estimated values obtained from the mixed-color patches that fall within the total amount control range. Because of that, in the image processing apparatus, the calibration accuracy can be prevented from decreasing in the vicinity of 100% gradation. At the same time, the number of patches can also be reduced. That makes it possible to draw close to high-accuracy calibration over the entire density range.

Figure 5:
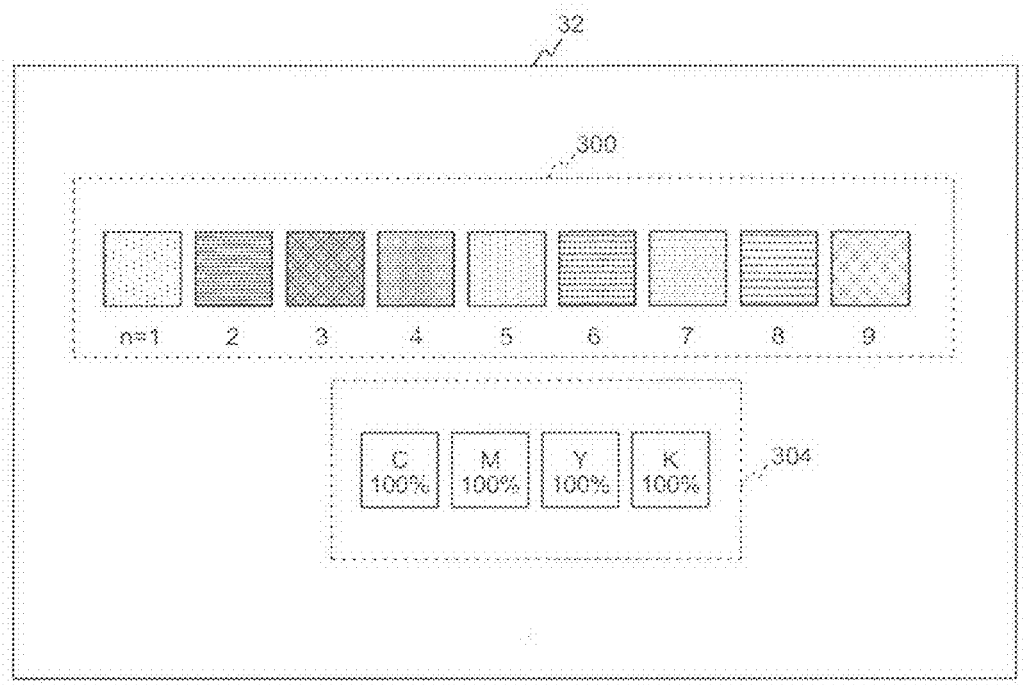
FIG. 5 is an illustrative diagram of a fourth configuration of the patch image.

FIG. 5 is an illustrative diagram of a fourth configuration of the patch image 3. In the fourth configuration, on a paper surface 32, the printer output unit 2 not only forms the mixed-color patches 300 of the first configuration (see FIG. 2A) but also forms single-color patches 304 of all single colors of 100% gradation. In an identical manner to the first configuration, the single-color estimating unit 5 performs single color estimation from the mixed-color patches 300. Meanwhile, regarding 100% gradation, the color measuring unit 4 performs color measurement of the single-color patches that are output. Then, the color measurement values are used without modification by the correction table setting unit 6, while bypassing the single-color estimating unit 5. That is done because, if the single color densities are estimated from the mixed-color patches using an approximation formula, then the approximation accuracy decreases.

Figure 6:
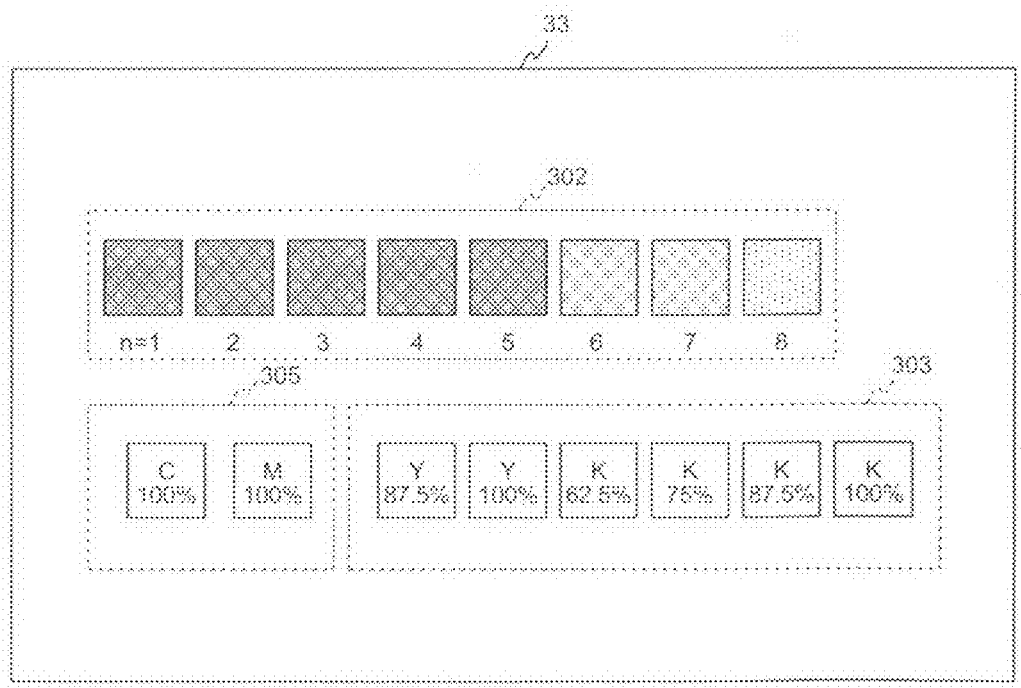
FIG. 6 is an illustrative diagram of a fifth configuration of the patch image.

FIG. 6 is an illustrative diagram of a fifth configuration of the patch image 3. In the fifth configuration, on a paper surface 33, the printer output unit 2 not only forms mixed-color patches 302 and the single-color patches 303 of the second configuration (see FIG. 3A) but also forms single-color patches 305 of the single colors of C and M of 100% gradation. In an identical manner to the second configuration, the single-color estimating unit 5 estimates single color densities from the mixed-color patches 302. In the image processing apparatus, regarding the single-color patches 303, the color measurement values measured by the color measuring unit 4 are used without modification by the correction table setting unit 6, while bypassing the single-color estimating unit 5.

Regarding the single-color patches of 100% gradation, since the single-color patches of Y and K are included in the single-color patches 303, the configuration is such that the color measurement values are used. In contrast, in the second configuration, the single-color patches of C and M are estimated from the mixed-color patches. With respect to that, the mixed-color patch corresponding to n=9 is removed from the set of mixed-color patches and the single-color patches 305 are included. As a result, in the image processing apparatus; regarding all single colors of 100% gradation, the color measurement values are used without modification by the correction table setting unit 6 in an identical manner to the fourth configuration.

FIGS. 7A, 7B, and 7C are explanatory diagrams for explaining the correction table setting unit 6. Although the correction table is set for each single color, the following explanation is given for the correction table set for only one of the single colors.

A table shown in FIG. 7A represents target densities Dc of the cyan color with respect to gradation values C from 0 to 255. The target densities Dc are predetermined fixed values serving as target color values of calibration.

A table shown in FIG. 7B represents single-color densities Dc, which are estimated from the mixed-color patches by the single-color estimating unit 5, with respect to post-gamma-correction gradation values Cg. As illustrated above in each configuration of the patch image 3, in the case of using not the estimated values but the actual measurement values of the single-color patches in the vicinity of 100% gradation, the single-color densities Dc include the actual measurement values for the gradation of only that portion. The correction table setting unit 6 converts the plotting of the estimated values (sometimes including the actual measurement values) into a table formed of a smooth curve by implementing polynomial approximation. Meanwhile, the plotting of the estimated values (actual measurement values) includes the noise present at the time of outputting patches or includes the gaps present in a switching unit for switching between the estimated values and the actual measurement values. In order to prevent the table from becoming unsteady by the effect of noise or gaps, the correction table setting unit 6 implements polynomial approximation of about third order to perform approximation with a curve that does not necessarily pass the plotting.

A table shown in FIG. 7C represents a correction table for cyan color that is created by combining the tables shown in FIGS. 7A and 7B in such a way that the target densities Dc correspond with the estimated densities (or the actual measurement densities) Dc.

Meanwhile, as illustrated in FIGS. 7A to 7C, with respect to the target density Dc corresponding to C=255, the estimated density (or the actual measurement density) Dc corresponding to Cg=255 sometimes has a small value. In such a case, if the correction table is set, Cg=255 is achieved at a value of C that is smaller than 255, thereby causing gradation collapse (see "pre-correction" in the table shown in FIG. 7C). In this case, the correction table setting unit 6 temporarily sets the correction table and then corrects it in the vicinity of the gradation value 255 in such a way that a smooth gradation is achieved (see "post-correction" in the table shown in FIG. 7C).

Meanwhile, in the image processing apparatus according to the present embodiment, the object of the present invention can also be achieved when a computer (central processing unit (CPU) or micro processing unit (MPU)) of the apparatus reads, from a memory medium, and executes the computer programs for performing the functions of the embodiment. In that case, the computer programs read from the memory medium achieve the functions of the embodiment. As the memory medium for providing the computer programs, it is possible to use a hard disk, an optical disk, a magneto-optical disk, a nonvolatile memory card, a read only memory (ROM), or the like. The computer reads and executes the computer programs to perform the functions of the embodiment. That includes the case when the operating system (OS) running on the computer performs, in part or in whole, the functions of the embodiment according to the instructions given in the computer programs. Moreover, the computer programs loaded from the memory medium can be written into a memory disposed in a function expansion board that is installed inside the computer or in a function expansion unit that is connected to the computer. In that case, a CPU in the function expansion board or the function expansion unit executes the instructions given in the computer programs and performs, in part or in whole, the functions of the embodiment. Furthermore, the computer programs for performing the functions of the embodiment can also be provided from a server via network communication.

In this way, according to an aspect of the present invention, the number of patches in a mixed-color patch can be reduced and high-accuracy calibration can be performed over the entire density range.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a patch forming unit configured to form a plurality of mixed-color patches by superposing first-type single color patches of a first color of a plurality of colors, arranged in an ascending order of gradation values, with a same number of second-type single color patches of a second color of the plurality of colors, arranged in a descending order of the gradation values;
   a color measuring unit configured to perform at least one color measurement of the mixed-color patches;
   an estimating unit configured to estimate color values of single colors present in the mixed-color patches based on the at least one color measurement obtained by the color measuring unit; and a correction table setting unit configured to set a correction table to correct the estimated color values of the single colors to target color values.

2. The image processing apparatus according to claim 1, wherein the patch forming unit is further configured to form the plurality of mixed-color patches by superposing the first-type single-color patches, the second-type single-color patches, third-type single-color patches of a third color of the plurality of colors, arranged in the ascending order of the gradation values, and fourth-type single-color patches of a fourth color of the plurality of colors, arranged in the descending order of the gradation values.

3. The image processing apparatus according to claim 1, wherein, at a different position than a position of the plurality of mixed-color patches formed by superposing the first-type single-color patches and the second-type single-color patches, the patch forming unit is further configured to form additional mixed-color patches by superposing third-type single-color patches of a third color of the plurality of colors, arranged in the ascending order of the gradation values, and fourth-type single-color patches of a fourth color of the plurality of colors, arranged in the descending order of the gradation values.

4. The image processing apparatus according to claim 1, wherein the patch forming unit is further configured to form the plurality of mixed-color patches by superposing single-color patches having different color numbers according to the gradation values.

5. The image processing apparatus according to claim 1, wherein the estimating unit is further configured to estimate the color values of the single colors constituting the plurality of mixed-color patches by using matrix coefficients corresponding to color numbers of the single colors constituting the plurality of mixed-color patches.

6. The image processing apparatus according to claim 1, wherein
the patch forming unit is further configured to form, apart from the plurality of mixed-color patches, a single-color patch of highest gradation value, and
the correction table setting unit is further configured to set the correction table based on the estimated color values of the single colors estimated from the plurality of mixed-color patches and a color measurement value of the single-color of the highest gradation value.

7. An image processing method comprising:
forming a plurality of mixed-color patches by superposing first-type single color patches of a first color of a plurality of colors, arranged in an ascending order of gradation values, with a same number of second-type single color patches of a second color of the plurality of colors, arranged in a descending order of the gradation values;
estimating color values of single colors present in the mixed-color patches based on the at least one color measurement; and
setting a correction table in order to correct the estimated color values of the single colors to target color values.

8. The image processing image processing method of claim 7, wherein the forming the plurality of mixed-color patches includes superposing the first-type single-color patches, the second-type single-color patches, third-type single-color patches of a third color of the plurality of colors, arranged in the ascending order of the gradation values, and fourth-type single-color patches of a fourth color of the plurality of colors, arranged in the descending order of the gradation values.

9. The image processing image processing method of claim 7, wherein, at a different position than a position of the plurality of mixed-color patches formed by superposing the first-type single-color patches and the second-type single-color patches, the image processing method further comprises:
forming additional mixed-color patches by superposing third-type single-color patches of a third color of the plurality of colors, arranged in the ascending order of the gradation values, and fourth-type single-color patches of a fourth color of the plurality of colors, arranged in the descending order of the gradation values.

10. The image processing image processing method of claim 7, wherein the estimating includes estimating the color values of the single colors constituting the plurality of mixed-color patches by using matrix coefficients corresponding to color numbers of the single colors constituting the plurality of mixed-color patches.

11. The image processing image processing method of claim 7, further comprising:
forming, apart from the plurality of mixed-color patches, a single-color patch of highest gradation value, and
setting the correction table based on the estimated color values of the single colors estimated from the plurality of mixed-color patches and a color measurement value of the single-color of the highest gradation value.

12. A non-transitory computer readable medium including a computer program product, the compute program product comprising instructions, which when executed by a computer, causes the computer to perform operations comprising:
forming a plurality of mixed-color patches by superposing first-type single color patches of a first color of a plurality of colors, arranged in an ascending order of gradation values, with a same number of second-type single color patches of a second color of the plurality of colors, arranged in a descending order of the gradation values;
performing at least one color measurement of the mixed-color patches;
estimating color values of single colors present in the mixed-color patches based on the at least one color measurement; and
setting a correction table in order to correct the estimated color values of the single colors to target color values.

* * * * *